United States Patent Office 3,781,440
Patented Dec. 25, 1973

3,781,440
ANIMAL FEED COMPOSITIONS AND METHODS
Gino J. Marco, Webster Groves, Mo., and Robert B. Grainger, Palm Desert, Calif., assignors to Monsanto Company, St. Louis, Mo.
No Drawing. Filed Nov. 7, 1969, Ser. No. 874,957
Int. Cl. A61k 27/00
U.S. Cl. 424—300                                13 Claims

ABSTRACT OF THE DISCLOSURE

Feed compositions containing at least one compound of the class of thiolcarbamates are useful for improving the growth response in animals.

---

This invention relates to novel compositions and to methods of improving the growth response in animals.

In accordance with the present invention, it has been found that certain thiolcarbamates are useful growth promoters for animals. Animal diets containing the thiolcarbamates elicit a substantially greater weight gain and feed efficiency response in animals than when said diets are used alone. The growth promoting compounds are also useful for the improvement of carcass quality in cattle as manifested in increased marbling.

The improved weight gain and feed efficiency response in animals is accomplished in accordance with this invention by a method which comprises administering to the animal a growth-promoting amount of at least one thiolcarbamate of the formula

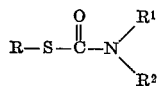

wherein R is selected from the group consisting of alkyl of not more than 12 carbon atoms, lower alkenyl, halo lower alkyl of not more than 3 halogen atoms, halo lower alkenyl of not more than 3 halogen atoms, cyclohexenyl and

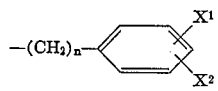

wherein $n$ is an integer 0 or 1 and $X^1$ and $X^2$ are each selected from the group consisting of hydrogen, chlorine, bromine, nitro, and lower alkyl; $R^1$ is selected from the group consisting of hydrogen, lower alkyl, lower alkenyl, halo lower alkyl of not more than 3 halogen atoms, halo lower alkenyl of not more than 3 halogen atoms, lower alkoxy lower alkyl and chloroacetyl of not more than 3 chlorine atoms; $R^2$ is selected from the group consisting of hydrogen, lower alkyl, lower alkenyl, lower alkoxy, lower alkyl, cyclohexyl and

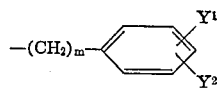

wherein $m$ is an integer 0 or 1 and $Y^1$ and $Y^2$ are each selected from the group consisting of hydrogen, chlorine, bromine, nitro, lower alkyl and lower alkoxy; and $R^1$ and $R^2$ together with the nitrogen atom is selected from the group consisting of

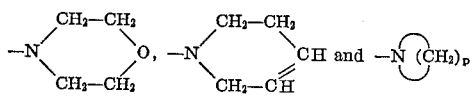

wherein $p$ is an integer from 4 to 8 inclusive.

The compounds of the above formula are useful for improving the growth response in meat producing animals, for example, poultry, swine and ruminants. The compounds are particularly advantageous for improving the growth response in cattle and sheep.

In the above formula R can be, for example, alkyl such as methyl, ethyl, n-propyl, isopropyl, n-butyl, sec-butyl, isobutyl, tert-butyl, amyl, hexyl, heptyl, octyl, nonyl, decyl, undecyl, dodecyl and the various isomers of alkyl of not more than 12 carbon atoms, lower alkenyl such as vinyl, allyl, n-butenyl-1, and the various isomers of alkenyl of at least 2 and not more than 4 carbon atoms, halo lower alkyl such as chloromethyl, dichloromethyl, bromomethyl, iodomethyl, fluoromethyl, trichloromethyl, dibromomethyl, diiodoethyl, dibromoethyl, chloro-n-butyl, bromo-tert-butyl, 1,3,3 - trichlorobutyl, 1,3,3 - tribromobutyl, 3-chloro-propyl, 2,3-difluoroethyl and the halogenated straight and branched chain alkyls of not more than 4 carbon atoms and 3 halogen atoms, halo lower alkenyl such as chlorovinyl, bromovinyl, chloroallyl, bromoallyl, 4-iodo-n-butenyl-2, 3-chloro-n-butenyl-1, 2,3,3-trichloroallyl, and the halogenated lower alkenyls of not more than 4 carbon atoms and 3 halogen atoms, cyclohexenyl, phenyl, substituted phenyl such as p-chlorophenyl, 3,4-dichlorophenyl, 2,6-dibromophenyl, p-nitrophenyl, 3-methylphenyl, 3,4-diethylphenyl, p-tert-butylphenyl, 3,4-dipropylphenyl and the like, benzyl and substituted benzyl such as 3,4-dichlorobenzyl, 2,6-dibromobenzyl, 2,3-dimethylbenzyl, p-tert-butylbenzyl, 3,4-dinitrobenzyl, 2,6-diethylbenzyl and the like.

$R^1$ in the above formula can be, for example, hydrogen, lower alkyl of not more than 4 carbon atoms such as methyl, ethyl, n-propyl, isopropyl, n-butyl, sec-butyl, isobutyl, lower alkenyl, halo lower alkyl, halo lower alkenyl, such as described for R above, lower alkyl lower alkoxy such as methoxymethyl, ethoxymethyl, butoxymethyl, methoxyethyl, ethoxyethyl, propoxyethyl, propoxypropyl, butoxypropyl, butoxybutyl, ethoxybutyl and the like having not more than 8 carbon atoms, and chloroacetyl such as chloroacetyl, trichloroacetyl and the like.

In the above formula $R^2$ can be, for example, hydrogen, lower alkyl, lower alkenyl, lower alkoxy lower alkyl as described above for $R^1$, cyclohexyl, phenyl, substituted phenyl such as 3,4-dichlorophenyl, p-bromophenyl, 2,6-dichloro-phenyl, 3-propylphenyl, p-butoxyphenyl, 3,4-dinitrophenyl, p-methoxyphenyl, p-tert-butylphenyl and the like, benzyl and substituted benzyl such as 2,3-dichlorobenzyl, p-nitrobenzyl, 3,4-dimethoxybenzyl, 3-butoxyphenyl, 3-propoxybenzyl, 3,4-dipropylbenzyl, p-tert-butylbenzyl and the like.

$R^1$ and $R^2$, in the above formula, together with the nitrogen atom, can constitute a cyclic group for example, morpholino, 1,2,3,6-tetrahydropyridinyl and saturated cyclic groups containing at least 4 and not more than 8 ring carbon atoms, such as piperidino, 1-pyrrolidinyl, octahydro-1H-azoninyl and the like.

While the compounds of the above formula possess animal growth promoting properties and are useful in the practice of this invention certain classes of compound have been found to be particularly advantageous. Where R is alkyl it is preferably lower alkyl, for example, methyl, ethyl, propyl, isopropyl and butyl. Where one of $R^1$ and $R^2$ is other than hydrogen R is preferably an aromatic substituent for example benzyl, phenyl, 3,4-dichlorophenyl, p-nitrobenzyl, and the like. Where both $R^1$ and $R^2$ are other than hydrogen R is preferably lower alkyl, lower alkenyl or the halo substituted derivatives thereof. Where any of R, $R^1$ and $R^2$ is a halo substituted substitutent the halogen atoms are preferably chlorine or bromine.

The value of animal feeds generally has been determined directly by feeding the animal. Within the past few years, however, the in vitro rumen technique whereby the changes occurring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. In the following examples the parameter employed in evaluating the thiolcarbamates is the change in propionic acid content in the rumen fluids. An increase in the propionic acid content in the rumen fluid indicates that a desirable response in overall ruminant performance has been brought about by the thiolcarbamates in the feed compositions. These in vitro observations have been confirmed by long-term in vivo feeding of ruminants in which weight gain and feed efficiency are measured.

In the examples of the present invention which follow, evaluation of the thiolcarbamates is made (1) in vitro and (2) in vivo. The in vitro rumen fluids are analyzed by a gas chromatographic procedure to determine the change of propionic acid content therein. The change in propionic acid content is expressed as percent of the priopionic acid content found in the control rumen fluid. In other examples long-term in vivo feeding studies are used to show improved animal performance.

The following examples, in which parts and percent are expressed by weight unless otherwise indicated, further illustrate the advantages of this invention.

EXAMPLE 1

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alpha-cellulose, and 15% soybean meal). The mixture is evaporated in a nitrogen atmosphere with constant stirring to provide a substrate coated with the test additive. This coated substrate (119 mg.) is mixed with 300 mg. of uncoated substate and charged ot 50 ml. Erlenmeyer flasks. Rumen fluid from a fasted sheep (7 to 8 hours) is taken, filtered through four layers of cheesecloth and 10 ml. of the fluid charged to each flask. A buffer solution of the following composition is prepared and adjusted to pH 6.8 with aqueous 4 N HCl.

| | Buffer solution in grams per liter |
|---|---|
| $NaH_2PO_4$ | .316 |
| $KH_2PO_4$ | .152 |
| $NaHCO_3$ | 2.260 |
| KCl | .375 |
| NaCl | .375 |
| $MgSO_4$ | .112 |
| $CaCl_2$ | .038 |
| $FeSO_4 \cdot 7H_2O$ | .008 |
| $ZnSO_4 \cdot 7H_2O$ | .004 |
| $CuSO_4 \cdot 5H_2O$ | .002 |
| $CoCl_2$ | .001 |

Ten milliliters of the buffer solution are added to each flask. The flasks are purged with nitrogen, stoppered with pressure release valves and heated at 39° C.+0.5° C. on a water shaker bath. The fermentation mixtures are incubated for 16 hours and then analyzed to determine the propionate response. Results are given in Table I.

TABLE I

| Compound: | Propionate response, percent of control |
|---|---|
| Benzyl thiolcarbamate | 105 |
| 3-chloropropyl thiolcarbamate | 118 |
| 3-chloroallyl thiolcarbamate | 114 |
| 2,3-dichloroallyl thiolcarbamate | 118 |
| 3,3-dichloroallyl thiocarbamate | 126 |
| 2-cyclohexenyl thiolcarbamate | 101 |
| Methyl N-cyclohexyl thiolcarbamate | 103 |
| Ethyl N-cyclohexyl thiolcarbamate | 104 |
| 3-chloropropyl N-methyl thiolcarbamate | 103 |
| Allyl N-2-methoxyethyl thiolcarbamate | 104 |
| 2-chloroallyl N-ethyl thiolcarbamate | 108 |
| Cis and trans 2,3-dichloroallyl N-methyl thiolcarbamate | 156 |
| 2,3,3 - trichloroallyl N-methoxyethyl thiolcarbamate | 155 |
| Ethyl m-methyl-thiolcarbanilate | 101 |
| Ethyl o-nitro-thiolcarbanilate | 114 |
| Ethyl p-nitro-thiolcarbanilate | 109 |
| Ethyl 3,4-dichloro-thiolcarbanilate | 123 |
| 2-chloroallyl thiolcarbanilate | 126 |
| 2-chloroallyl p-methoxy-thiolcarbanilate | 112 |
| 2-choroallyl p-ethoxy-thiolcarbanilate | 103 |
| Butyl 3,4-dichloro-thiolcarbanilate | 121 |
| Butyl thiolcarbanilate | 117 |
| t-Butyl 3,4-dichloro-thiolcarbanilate | 102 |
| Pentyl 3,4-dichloro-thiolcarbanilate | 121 |
| Phenyl N-methyl thiolcarbamate | 172 |
| m-Tolyl N-methyl thiolcarbamate | 171 |
| m-Tolyl N-ethyl thiolcarbamate | 152 |
| p-Chlorophenyl N-methyl thiolcarbamate | 165 |
| 3,4 - dichlorophenyl N-cyclohexyl thiolcarbamate | 104 |
| Phenyl thiolcarbanilate | 117 |
| p-Chlorophenyl p-nitro-thiolcarbanilate | 120 |
| 3,4-dichlorophenyl m-chloro-thiolcarbanilate | 107 |
| Methyl N-chloroacetyl thiolcarbamate | 109 |
| Methyl N-trichloroacetyl thiolcarbamate | 161 |
| Ethyl N-trichloroacetyl thiolcarbamate | 168 |
| p-Nitrophenyl N-chloroacetyl thiolcarbamate | 159 |
| Phenyl N,N-dimethyl thiolcarbamate | 106 |
| Phenyl N,N-diethyl thiolcarbamate | 116 |
| Phenyl N,N-diallyl thiolcarbamate | 132 |
| Phenyl N-allyl N-cyclohexyl thiolcarbamate | 111 |
| p-Chlorophenyl N,N-dimethyl thiolcarbamate | 105 |
| p-Chlorophenyl N,N-diethyl thiolcarbamate | 117 |
| p-Chlorophenyl N,N-diallyl thiolcarbamate | 120 |
| Isopropyl N-chloroacetyl 3,4 - dichlorothiolcarbanilate | 124 |
| Isopropyl N-dichloroacetyl 3,4-dichlorothiolcarbanilate | 139 |
| Methyl N-ethyl N-cyclohexyl thiolcarbamate | 132 |
| Methyl N-allyl N-cyclohexyl thiolcarbamate | 180 |
| Methyl N-butyl N-cyclohexyl thiolcarbamate | 128 |
| Benzyl N,N-bis(ethoxyethyl)thiolcarbamate | 117 |
| Benzyl N,N-dibutyl thiolcarbamate | 104 |
| 2,6 - dichlorobenzyl N,N-diisopropyl thiolcarbamate | 108 |
| 2,5 - dichlorobenzyl N,N - diisopropyl thiolcarbamate | 112 |
| Benzyl N,N-bis(methoxyethyl)thiolcarbamate | 117 |
| Ethyl N,N-bis(2-ethoxyethyl)thiolcarbamate | 125 |
| Ethyl N-methyl N-cyclohexyl thiolcarbamate | 131 |
| Ethyl N-ethyl N-cyclohexyl thiolcarbamate | 137 |
| Ethyl N-isopropyl N-cyclohexyl thiolcarbamate | 135 |
| 2-chloroethyl N,N-diisopropyl thiolcarbamate | 155 |
| 2-chloroethyl N-methyl N-cyclohexyl thiolcarbamate | 128 |
| 2-bromoethyl N,N-diisopropyl thiolcarbamate | 112 |
| Propyl N-3-chloropropyl N-propyl thiolcarbamate | 119 |

TABLE I—Continued

| Compound: | Propionate response, percent of control |
|---|---|
| 3-chloropropyl N,N-diethyl thiolcarbamate | 150 |
| 3-chloropropyl N,N-diisopropyl thiolcarbamate | 136 |
| 3-chloropropyl N-ethyl N-cyclohexyl thiolcarbamate | 120 |
| Allyl N,N-dimethyl thiolcarbamate | 113 |
| Allyl N,N-bis(2-ethoxyethyl)thiolcarbamate | 129 |
| Allyl N,N-diisopropyl thiolcarbamate | 135 |
| Allyl N,N-dipropyl thiolcarbamate | 135 |
| Allyl N-ethyl N-cyclohexyl thiolcarbamate | 160 |
| Allyl N-butyl N-cyclohexyl thiolcarbamate | 118 |
| 2-chloroallyl N,N-diethyl thiolcarbamate | 119 |
| 2-chloroallyl N,N-bis(2-ethoxyethyl)thiolcarbamate | 147 |
| 2-chloroallyl N,N-bis(2-ethoxyethyl)thiolcarbamate | 131 |
| 3,3-dichloroallyl N,N-diethyl thiolcarbamate | 135 |
| 2,3,3-trichloroallyl N,N-diethyl thiolcarbamate | 145 |
| 2-cyclohexenyl N,N-diisopropyl thiolcarbamate | 124 |
| t-Butyl N-isopropyl thiolcarbanilate | 102 |
| Methyl 1,2,3,6-tetrahydropyridine-1 carbothiolate | 111 |
| Methyl hexahydro-1(2H)-azocine-carbothiolate | 177 |
| Benzyl 1-pyrrolidine-carbothiolate | 136 |
| Benzyl 1-piperidine-carbothiolate | 128 |
| Benzyl 1-hexamethyleneimine-carbothiolate | 127 |
| Benzyl octamethyleneimine-carbothiolate | 102 |
| Ethyl 1-pyrrolidine-carbothiolate | 115 |
| Ethyl 1-hexamethyleneimine-carbothiolate | 165 |
| Ethyl octahydro-1H-azonine-1-carbothiolate | 127 |
| Isopropyl octahydro-1H-azonine-1-carbothiolate | 137 |
| Allyl 1-hexamethyleneimine-carbothiolate | 159 |
| 2-chloroallyl 1-hexamethyleneimine-carbothiolate | 126 |
| 2-chloroallyl morpholino-carbothiolate | 105 |
| 2-chloroallyl 1,2,3,6-tetrahydropyridine-1-carbothiolate | 141 |
| 2-bromoallyl 1-hexamethyleneimine-carbothiolate | 159 |
| t-Butyl 1-hexamethyleneimine-carbothiolate | 126 |
| 2-cyclohexenyl 1-hexamethyleneimine carbothiolate | 148 |
| Phenyl piperidine-carbothiolate | 115 |
| Phenyl morpholino-carbothiolate | 108 |
| p-Chlorophenyl piperidine-carbothiolate | 111 |

A basal ration having approximately the following composition was used in Examples 2 and 3.

| Component: | Percent |
|---|---|
| Ground corn | 31.3 |
| Soybean meal (50% protein) | 15.0 |
| Molasses | 8.1 |
| Trace minerals | 0.1 |
| Iodized salt | 0.5 |
| Ground corn cobs | 10.0 |
| Defluorinated phosphate | 0.8 |
| Vitamins A and D | 0.1 |
| Chopped alfalfa hay | 34.1 |

EXAMPLE 2

A number of sheep feeding studies were carried out with the above basal ration and the various thiolcarbamates listed below in Table II. In each study one group of sheep was fed the basal ration without a thiolcarbamate additive to serve as the control. Feed efficiency was determined from the average daily weight gain and average daily feed consumption for each group of sheep, self-fed, over a twenty-one day period. The feed efficiency as percent of the control is set forth in Table II. The thiolcarbamates were incorporated into the basal ration at a level of 0.005% by weight of the ration.

TABLE II

| Compound: | Feed efficiency, percent of control |
|---|---|
| Control | 100 |
| Isopropyl thiolcarbamate | 131 |
| Pentyl thiolcarbamate | 119 |
| Hexyl thiolcarbamate | 149 |
| 3-chloroallyl thiolcarbamate | 128 |
| 3,3-dichloroallyl thiolcarbamate | 121 |
| 2-cyclohexenyl thiolcarbamate | 105 |
| Benzyl thiolcarbamate | 128 |
| Butyl 3,4-dichloro-thiolcarbanilate | 113 |
| Cis and trans 2,3-dichloroallyl N-methyl thiolcarbamate | 111 |
| Phenyl N-methyl thiolcarbamate | 134 |
| m-Tolyl N-methyl thiolcarbamate | 139 |
| m-Tolyl N-ethyl thiolcarbamate | 129 |
| Allyl 1-pyrolidine-carbothiolate | 191 |
| t-Butyl hexamethyleneimine-carbothiolate | 175 |
| Hexyl hexamethyleneimine-carbothiolate | 138 |
| Octyl hexamethyleneimine-carbothiolate | 129 |
| Methyl hexamethyleneimine-carbothiolate | 155 |
| 2-chloroallyl hexamethyleneimine carbothiolate | 140 |

EXAMPLE 3

Following the procedure of Example 2, a number of sheep feeding studies were carried out using the basal ration containing 0.005% by weight of the thiolcarbamates set forth in Table III.

TABLE III

| Compound: | Feed efficiency, percent of control |
|---|---|
| Control | 100 |
| Dodecyl thiolcarbamate | 107 |
| Benzyl thiolcarbamate | 123 |
| Methyl phenyl thiolcarbamate | 134 |
| 2 chloroallyl p-methoxy-thiolcarbanilate | 103 |
| 2 chloroallyl N,N-diethyl thiolcarbamate | 107 |
| Allyl N,N-bis(2-ethoxyethyl)thiolcarbamate | 121 |
| Allyl N-ethyl N-cyclohexyl thiolcarbamate | 105 |
| Allyl 1-pyrolidine-carbothiolate | 140 |
| Hexyl hexamethyleneimine-carbothiolate | 168 |
| Octyl hexamethyleneimine-carbothiolate | 127 |
| Octyl octahydro-1H-azonine-1-carbothiolate | 155 |
| Allyl hexahydro-1(2H)-azocine-carbothiolate | 112 |

A basal ration having approximately the following composition was used in Example 4.

| Component: | Percent |
|---|---|
| Cracked corn | 43.3 |
| Soybean meal (50% protein) | 18.0 |
| Molasses | 10.0 |
| Trace minerals | 0.1 |
| Iodized salt | 0.5 |
| Ground corn cobs | 3.5 |
| Defluorinated phosphate | 1.34 |
| Ground limestone | 1.16 |
| Cottonseed hulls | 22.0 |
| Vitamins A and D | 0.1 |

EXAMPLE 4

Numerous groups of sheep were self-fed for 21 days the above basal ration containing 0.005 and 0.0005% by weight of the thiolcarbamates as set forth in Table IV. The feed efficiency of the test groups was determined and is reported below as percent of the control group which was fed the basal ration without any additive.

TABLE IV

| Compound | Additive, percent concentration | Feed efficiency, percent control |
|---|---|---|
| Control | | 100 |
| Phenyl N-methyl thiolcarbamate | 0.005 | 134 |
| | 0.0005 | 94 |
| m-Tolyl N-methyl thiolcarbamate | 0.005 | 139 |
| | 0.0005 | 103 |
| 2-chloroallyl N,N-diallyl thiolcarbamate | 0.005 | 115 |
| | 0.0005 | 159 |
| Ethyl octahydro-1H-azonine-1-carbothiolate | 0.005 | 138 |
| | 0.0005 | 118 |
| Butyl hexahydroazocine-1(2H)-carbothiolate | 0.005 | 118 |
| | 0.0005 | 100 |
| Methyl pentamethyleneimine-carbothiolate | 0.005 | 125 |
| | 0.0005 | 87 |
| 2-bromoallyl 1-pyrrolidine-carbothiolate | 0.005 | 133 |
| | 0.0005 | 98 |
| Isopropyl octahydro-1H-azonine-1-carbothiolate | 0.005 | 120 |
| | 0.0005 | 90 |
| 3-chloropropyl N,N-diethyl thiolcarbamate | 0.005 | 108 |
| | 0.0005 | 119 |
| Methyl N-ethyl N-cyclohexyl thiolcarbamate | 0.005 | 127 |
| | 0.0005 | 108 |
| 2-chloroallyl N-methyl N-cyclohexyl thiolcarbamate | 0.005 | 119 |
| | 0.0005 | 137 |
| 2-bromoallyl N-methyl N-cyclohexyl thiolcarbamate | 0.005 | 123 |
| | 0.0005 | 119 |
| 2-chloroallyl N,N-bis(2-ethoxyethyl)thiolcarbamate | 0.005 | 93 |
| | 0.0005 | 121 |
| Phenyl N,N-dimethyl thiolcarbamate | 0.005 | 102 |
| | 0.0005 | 98 |
| p-Chlorophenyl 4-morpholino-carbothiolate | 0.005 | 126 |
| | 0.0005 | 118 |

A basal ration having approximately the following composition was used in Example 5.

Component: Percent
- Chopped alfalfa hay — 14.5
- Steam rolled milo — 74.0
- Molasses — 8.0
- NaCl — 0.5
- Defluorinated phosphate — 0.8
- Trace minerals — 0.1
- Vitamins A and D — 0.1
- Ground milo/supplement premix [1] — 2.0

[1] Two and one-half pounds supplement containing the chemical additive mixed with 47.5 lbs. ground milo.

EXAMPLE 5

Four groups of cattle were self-fed the above basal ration for 84 days. One group was fed the basal ration without any additive to serve as the control. The other groups were fed the basal ration containing 0.0016, 0.0024 and 0.0032 percent by weight of isopropyl thiolcarbamate, respectively. The weight gain and feed efficiency was determined and is set forth in Table V below.

TABLE V

| Additive concentration, percent | Average daily gain, lbs. | Feed efficiency |
|---|---|---|
| None (control) | 2.60 | 6.74 |
| 0.0016 | 2.71 | 6.56 |
| 0.0024 | 2.85 | 6.28 |
| 0.0032 | 2.89 | 6.11 |

The thiolcarbamates useful in this invention are incorporated in animal feed compositions in an effective amount over a wide range of concentrations. Significant animal responses are obtained with daily rations containing from about 0.0001% by weight to about 0.1% by weight of the thiolcarbamates. Preferably, the daily ration contains from about 0.0005% by weight to about 0.05% by weight of the thiolcarbamates.

Based on a fattening lamb consuming about 3 pounds of ration per day and cattle each consuming about 20 pounds of ration per day, the thiolcarbamates are administered to sheep in an amount from about 0.0013 gm. to about 1.3 gm. per head per day, and to cattle in an amount from about 0.009 gm. to about 9.0 gm. per head per day. The thiolcarbamates are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed. Accordingly, the thiolcarbamates are administered to meat-producing animals in a daily amount of about 0.04 mg. to amout 80 mg. per kg. body weight. Preferably the thiolcarbamates are administered to animals in a daily amount of about 0.04 mg. to about 40 mg. per kg. body weight.

The oral administration of the thiolcarbamates in accordance with this invention can be accomplished in the form of tablets, capsules, powders, solutions, suspension or in admixture with one or more components of the animal's diet. Alternatively, the thiolcarbamate can be administered in an equivalent amount in a liquid carrier such as the animal's drinking water.

The novel animal feed premixes according to this invention comprise from about 0.1 to about 90 percent by weight of the thiolcarbamate and a nutritious feedstuff or by-product feedstuff. The thiolcarbamate is present in the premix in sufficient quantity to give the desired ratio of the thiolcarbamate to feed in the final ration fed to animals. For example, approximately 1 pound of isopropyl thiolcarbamate is blended with 99 pounds of ground milo in a conventional apparatus used for the preparation of dry feed mixes. Approximately five pounds of this premix is then blended with one ton of a balanced feed composition to provide a ration containing approximately 0.0025% by weight of isopropyl thiolcarbamate in the animal ration.

The suitable feedstuff present in the premixes of this invention can be any nutritious feedstuff or by-product feedstuff. Illustrative of the feedstuff or by-product feedstuff used as a carrier in the novel premixes are hay, grains, dehydrated alfalfa, ground corn, oat hulls, ground milo, soybean meal, fish meal, cottonseed meal, linseed meal, wheat middlings, corn gluten meal, distillers dried grain, molasses, soybean oil, peanut oil, corn oil, sesame oil and the like. An oil solution or emulsion lends itself to spraying on the basal ration and is particularly adapted for liquid compositions including drinking water. In addition to the thiolcarbamate and the nutritious feedstuff or by-product feedstuff the premixes in accordance with this invention can also contain stabilizers and other feed additives such as vitamins, antibiotics, minerals, hormones, steroids and other feed supplements of this nature. The premix can be supplied to grain mills or feed manufacturers who then incorporate the premix into the finished diet to be supplied to the animals by the farmer.

The feed compositions of this invention are suitable animal feeds containing a growth-promoting amount of at least one compound of the above formula, for example, the basal rations fully described hereinabove.

The feed compositions of this invention can be prepared by incorporating the thiolcarbamate in various ways into the conventional components of the diet for the type of animal in question. The thiolcarbamates can be added to the diet ration as pure compounds or in the form of a premix. The premixes of this invention are particularly desirable for the incorporation of the active thiolcarbamates in the feed composition.

An essential component in animal feeds is the cellulosic component. By the expression "cellulosic component" it is intended to refer to any nutrient component which contains at least 2% fiber. The fiber is principally cellulose which may also contain lignin chemically bound thereto. Typical fiber containing components include hay, straw, cottonseed hulls, cotton mill wastes, beet bulp, silage, corn, barley, alfalfa seed, oats, corn stalks, cereal brans, cereal middlings and the like. One or more of these cellusoic components is essential in balanced feed compositions and at least 2% by weight is included and as much as 99.99% or more can be used. However, in some areas animals are fed diets consisting essentially of barley and/or oats or substantially entirely of these high fiber cereals.

In the preparation of the animal feed compositions of this invention at least one cellulosic component is preferably present in excess of 2% by weight although it usually greatly exceeds this preferred minimum content. These fiber containing components are conventional in animal feeds and aid the direction of the nutrients in the balanced ration.

The animal feeds may contain natural oils including animal fats, such as beef tallow, mutton tallow; fish oils including eel, herring, menhaden, tuna and salmon oils; and vegetable oils. The vegetable oils are usually liquid, for example, soybean oil, sunflower oil, olive oil, safflower oil, corn oil, peanut oil, cottonseed oil, rice oil, millet oil, wheat grem oil and palm oil. Any of these can be included in the feed.

An optional component of the animal feeds is a non-toxic antioxidant. These substances tend to preserve vitamins and the unsaturation in oils by preventing the oxidation which normally occurs during the storage and use of the animal feeds. In the feed compositions the use of from 0.001 to 0.1% by weight of the non-toxic antioxidant has been found to be satisfactory.

Complete balanced feeds can contain, if desired, in addition to the cellulosic component and the thiocarbamate, the natural oils, antioxidants, minerals such as bone meal, salt and the various trace minerals including salts of zinc, copper, manganese, magnesium, cobalt, iodine and iron. Antibiotics, steroids, anthelmintics and other medicaments can be used. Various vitamins particularly A, B, E, and D complexes can be added to provide for the deficiencies in these vitamins incident to the selection of the various components of the complete feed. Stilbestrol is another optional component. Other basic nutrients such as casein, other milk by-products and urea can be used if desired or if they are necessary to satisfy the requirements of the complete ration.

The thiolcarbamates also can be administered to the animals subcutaneously or intramuscularly in the form of solutions, pastes or pellets, but it is generally more convenient to use the active material in the animal's feed composition.

The thiolcarbamates useful in this invention can be prepared by several methods known to those skilled in the art. The halide corresponding to the desired ester is condensed with an alkali metal thiolcarbamate in one method. The alkali metal thiolcarbamates are available from the reaction of carbonoxysulfide with amines in the presence of alkali. Another method is to condense a carbonyl halide with a mercaptan or mercaptide. In another method ureas are reacted with mercaptans in the presence of deaminating agents for example boron trifluoride. The useful N-chloroacetyl thiolcarbamates are readily prepared by the reaction or chloroacetyl isocyanate and a mercaptan.

EXAMPLE 6

A solution of 180 grams (1.0 mole) of 25% dimethylamine, 160 grams (1.0 mole) of 25% sodium hydroxide and 1000 ml. of water was prepared and carbonoxysulfide then bubbled in at 0°–5° C. for 25 minutes or until there was a weight gain of 60.1 grams (1.0 mole). The reaction mixture was stirred at 0°–10° C. for one-half hour longer and the sodium dimethylthiolcarbamate obtained as a 9.16% solution. To 347.5 grams (0.25 mole) of the sodium dimethylthiolcarbamate solution so prepared there was added with stirirng 36.2 grams (0.25 mole) of cis- and trans-1,2,3-trichloro-1-propene, the stirring continued at 25°–30° C. for 24 hours, then the mixture heated at 50°–60° C. for 3 hours. After cooling to 20° C. the reaction mixture was extracted with 300 ml. of ethyl ether, washed with water until neutral to litmus, dried over sodium sulfate and the ether was removed in vacuo at a maximum temperature of 80° C.–90° C./1–2 mm. The cis- and trans-2,3-dichloroallyl N,N-dimethyl thiolcarbamate, an amber oil, was obtained in 65% theory yield.

EXAMPLE 7

To a stirred solution of 17 grams (0.1 mole) of heptamethyleneimine, 500 ml. of ethyl ether and 20.8 grams (0.15 mole) of potassium carbonate was added dropwise, at 0°–10° C., 20.5 grams (0.15 mole) of allyl thiocarbonyl chloride. After stirring at 25° C.–30° C. for 24 hours, 500 ml. of water were added and stirring continued for 15 minutes. The ether layer was washed with water until neutral to litmus and dried over sodium sulfate. The ether was removed in vacuo at a maximum temperature of 80°–90° C./1–2 mm. Allyl hexahydro-1(2H)-azocinecarbothiolate was obtained in 78% yield as a colorless liquid insoluble in water.

EXAMPLE 8

To a suitable reaction vessel fitted with a mechanical stirrer, a reflux condenser, an inlet tube and thermometer is added 170.5 parts (1 mole) or 3-chlorophenyl urea and 761.5 parts of 1-propanthiol. Boron fluoride gas is added while stirring and maintaining the temperature between 50° C. and 70° C. After 67 parts of boron fluoride are adsorbed the addition is stopped and the contents refluxed for one hour. The reaction mixture is cooled to room temperature, filtered to remove the ammonia-boron trifluoride complex and the latter solid is extracted with hot propanol and filtered. The filtrates are combined and distilled to remove the propanol and 1-propanthiol. The residue is recrystallized to yield propyl N-3-chlorophenyl thiolcarbamate, M.P. 78–85° C.

EXAMPLE 9

To a suitable vessel is charged 2.4 parts of alpha-chloroacetyl isocyanate dissolved in 25 parts of cold dichloromethane. While agitating 2.9 parts of 4-chlorothiophenol is added. The solution is concentrated by boiling off the excess dichloromethane. To the so concentrated solution is added sufficient hexane to precipitate the dissolved solids. The precipitate is filtered off and dried to give as a white solid 4-chlorophenyl N-chloroacetyl thiolcarbamate.

The above examples demonstrate the various known methods of preparing the esters of thiolcarbamic acids useful in this invention and are set forth for the purpose of illustration.

Although the invention is described with respect to specific modifications, the details thereof are not to be construed as limitations, for it will be apparent that various equivalents changes and modifications may be resorted to without departing from the spirit and scope thereof and it is understood that such equivalent embodiments are intended to be included herein.

The embodiments of the invention in which an exclusive property or privilege is claimed are defined as follows:

1. A method of improving the growth response in an animal selected from the group consisting of poultry, swine and ruminants which comprises orally administering to said animal a growth-promoting amount of a compound of the formula

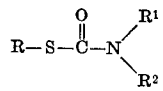

wherein

R is selected from the group consisting of alkyl of not more than 12 carbon atoms, lower alkenyl, halo lower alkyl of not more than 3 halogen atoms, halo lower alkenyl of not more than 3 halogen atoms, cyclohexenyl and

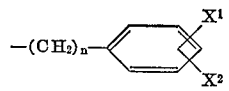

wherein $n$ is an integer 0 or 1 and $X^1$ and $X^2$ are each selected from the group consisting of hydrogen, chlorine, bromine, nitro, and lower alkyl;

$R^1$ is selected from the group consisting of hydrogen, lower alkyl, lower alkenyl, halo lower alkyl of not more than 3 halogen atoms, halo lower alkenyl of not more than 3 halogen atoms, lower alkoxy lower alkyl and chloroacetyl of not more than 3 chlorine atoms; and $R^2$ is selected from the group consisting of hydrogen, lower alkyl, lower alkenyl, lower alkoxy lower alkyl, cyclohexyl and

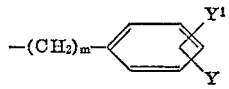

wherein $m$ is an integer 0 or 1 and $Y^1$ and $Y^2$ are each selected from the group consisting of hydrogen, chlorine, bromine, nitro, lower alkyl and lower alkoxy.

2. The method of claim 1 wherein R is alkyl.
3. The method of claim 1 wherein R is lower alkenyl.
4. The method of claim 1 wherein R is

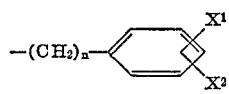

and $R^2$ is hydrogen.

5. The method of claim 1 wherein R is alkyl, $R^1$ is lower alkyl and $R^2$ is lower alkyl.
6. The method of claim 1 wherein R is alkyl, $R^1$ is lower alkyl and $R^2$ is cyclohexyl.
7. The method of claim 1 wherein R is alkyl, $R^1$ is lower alkyl and $R^2$ is

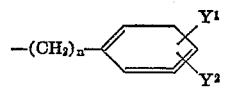

8. A method of improving the growth response in an animal selected from the group consisting of poultry, swine and ruminants which comprises feeding said animal a ration comprising animal feed and a growth-promoting amount of a compound of the formula

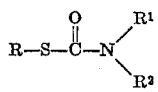

wherein

R is selected from the group consisting of alkyl of not more than 12 carbon atoms, lower alkenyl, halo lower alkyl of not more than 3 halogen atoms, halo lower alkenyl of not more than 3 halogen atoms, cyclohexenyl and

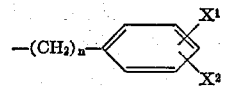

wherein $n$ is an integer 0 or 1 and $X^1$ and $X^2$ are each selected from the group consisting of hydrogen, chlorine, bromine, nitro, and lower alkyl;

$R^1$ is selected from the group consisting of hydrogen, lower alkyl, lower alkenyl, halo lower alkyl of not more than 3 halogen atoms, halo lower alkenyl of not more than 3 halogen atoms, lower alkoxy lower alkyl and chloroacetyl of not more than 3 chlorine atoms; and $R^2$ is selected from the group consisting of hydrogen, lower alkyl, lower alkenyl, lower alkoxy lower alkyl, cyclohexyl and

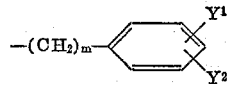

wherein $m$ is an integer 0 or 1 and $Y^1$ and $Y^2$ are each selected from the group consisting of hydrogen, chlorine, bromine, nitro, lower alkyl and lower alkoxy.

9. The method of claim 8 wherein the animal is a ruminant.
10. The method of claim 9 wherein R is alkyl, $R^1$ is lower alkyl and $R^2$ is lower alkyl.
11. The method of claim 9 wherein R is alkyl, $R^1$ is lower alkyl and $R^2$ is

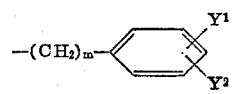

12. The method of claim 9 wherein the compound is isopropyl thiolcarbamate.
13. The method of claim 9 wherein the compound is benzyl thiolcarbamate.

References Cited
UNITED STATES PATENTS
3,330,643    7/1967    Harman et al. _____ 71—100
FOREIGN PATENTS
616,372    3/1961    Canada _____ 71—100

ALBERT T. MEYERS, Primary Examiner
F. E. WADDELL, Assistant Examiner

U.S. Cl. X.R.
424—244, 248, 263, 267, 274